United States Patent [19]
Houghtaling

[11] Patent Number: 4,706,226
[45] Date of Patent: Nov. 10, 1987

[54] SEISMIC LINE AMPLIFIER

[75] Inventor: Steven W. Houghtaling, Littleton, Colo.

[73] Assignee: Azygous, Westminster, Colo.

[21] Appl. No.: 796,658

[22] Filed: Nov. 8, 1985

[51] Int. Cl.$^4$ .......................... G01V 1/00; G01V 1/36
[52] U.S. Cl. ........................................ 367/66; 367/65; 330/284
[58] Field of Search ....................... 367/45, 46, 65, 66; 330/86, 129, 144, 145, 284, 289

[56] References Cited

U.S. PATENT DOCUMENTS

| | | | |
|---|---|---|---|
| 3,150,327 | 9/1964 | Taylor | 367/66 X |
| 3,287,695 | 11/1966 | Taylor | 367/46 |
| 3,699,325 | 10/1972 | Montgomery Jr. | 367/67 X |
| 3,863,200 | 1/1975 | Miller | 367/65 |
| 4,197,750 | 4/1980 | Hassler | 367/46 X |
| 4,321,675 | 3/1982 | Harris | 364/421 |

Primary Examiner—Thomas H. Tarcza
Assistant Examiner—Tod R. Swann
Attorney, Agent, or Firm—Dorr, Carson, Sloan & Peterson

[57] ABSTRACT

A geophone amplifier including a low cut filter which provides non-linear amplification of the signal to produce a substantially flat frequency response so as to enhance high frequency signals containing high resolution information. Discrete plug-in modules are used to custom design the parameters of the system to increase the signal-to-noise ratio and provide a signal which is conditioned for transmission to a data collection unit. Low power drain circuitry is used so that the system can be implemented as a portable unit for conditioning the seismic geophone signal prior to transmission over a long distance.

16 Claims, 3 Drawing Figures

SEISMIC LINE AMPLIFIER

BACKGROUND OF THE INVENTION

1. Field of Invention

The present invention pertains generally to analog circuitry and more specifically to seismic line amplifiers for conditioning geophone signals.

2. Description of the Background

Seismic exploration has been used for some time to locate various geostructures within the earth's crust. Seismic Exploration has typically been carried out by inducing vibrational waves in the earth and detecting the reflection of these vibrational waves at a number of locations on the surface. The detected signals from the geophone are transmitted to a data collection device which processes the information to generate a graphic depiction of the detected seismic waves.

Various disadvantages and limitations are associated with this conventional manner of collecting seismic data. For example, the seismic signal generated by the geophone is an extremely low amplitude signal which must be transmitted over miles of cable to the data collection device which typically comprises a mobile data collection unit. The signal-to-noise ratio of the seismic geophone signal received at the data collection unit is extremely low because of the extremely low amplitude of this transmitted signal. Additionally, attenuation and noise pick up which occurs during the transmission of the low amplitude signal further decreases signal-to-noise ratio of the signal received at the data collection unit. Linear amplification of such low amplitude signals in the presence of noise is difficult to achieve.

Other problems are also apparent. The resolution of data which can be obtained from the seismic geophone signal is dependent upon the frequency response of the signal. Higher frequency seismic signals contain higher resolution data capable of resolving smaller geostructures, than lower frequency seismic geophone signals. For example, seismic geophone signals in the frequency range of 100 to 147 hertz contain considerably higher resolution information than the same seismic geophone signals at frequencies below 100 hertz. The inherent natural filtering effects (Q) of the earth tend to attenuate the higher frequency signals in a non-linear manner. In other words, the earth has an attenuation factor (Q) which increases non-linearly with frequency. As a result, the higher frequency signals, which contain higher resolution information, are attenuated to a much greater extent than lower frequency signals. Consequently, the resolution which can be obtained from the seismic geophone signals is limited by the natural earth filtering effects (Q). In the process of amplifying the seismic geophone signal at the data collection unit, the dynamic range of the seismic geophone signal is limited at higher frequencies due to the attenuation of the higher frequency signals. Consequently, the data contained within the higher frequency signals is de-emphasized, or lost, in the amplified seismic geophone signal.

A search was performed on the present invention and the following patents were selected showing the closest patented art in the field:

| Inventor | U.S. Pat. No. | Issue Date |
|---|---|---|
| Montgomery, Jr. | 3,699,325 | Oct. 17, 1972 |

-continued

| Inventor | U.S. Pat. No. | Issue Date |
|---|---|---|
| Harris et al. | 4,321,675 | Mar. 23, 1982 |

U.S. Pat. No. 4,321,675 issued to Harris et al. on Mar. 23, 1982 discloses a method and apparatus for increasing the dynamic range of a data acquisition system at low frequencies without reducing frequency gain. Harris et al. discloses prior art having a dual input 1, 2 which is applied to a preamp 3 producing a dual output 5, 6 applied to a common mode rejection differential amplifier 7 to generate a single output 8. Single output 8 is applied to a low cut filter 9. The output 10 of low cut filter 9 is applied to a high cut filter 11 which comprises an anti-alias filter having approximately 48 dB per octave attenuation. This output is then applied to a notch filter 13 and to a low dc drift amplifier 15 for application to a multiplexer device 17. Harris et al. discloses the use of a variable gain amplifier disposed between the low cut filter and the high cut filter to expand the dynamic range of the overall line amplifier system by decreasing the amount of noise which is added to the circuit by the high cut filter.

U.S. Pat. No. 3,699,325 issued to Montgomery on Oct. 17, 1972 discloses a time shared instantaneous gain ranging amplifier which is used for a plurality of seismic data channels. The Montgomery system uses a preamplifier 10 which receives the output of the geophones or other similar devices. The output of the preamplifier 10 is applied to optional filters 12 which can include high and low pass filters and a 60 hertz notch filter. The output of the optional filters 12 is then applied to anti-alias filter 14. Preamplifier 10 comprises a differential amplifier which converts the signal from common mode to normal mode. Both the Harris et al. and Montgomery patents are specifically incorporated herein by reference and are made a part of this disclosure for all that they disclose.

The Harris et al. and Montgomery patents do not disclose a signal conditioning circuit which can be located proximate to a geophone in the field and operate with low power consumption from a battery power supply. Additionally, flexibility has not been provided to optimize parameters of the seismic line amplifier for various geologies.

Moreover, the prior art has failed to show a geophone line amplifier which is capable of producing a substantially flat frequency response despite natural earth filtering effects. Although this problem was generally addressed in a paper entitled "How High is High Resolution" at the 46th Annual SEG Meeting, Oct. 24-28, 1976, Houston, Texas, by John B. Farr, which is specifically incorporated herein by reference for all that it discloses, there is no disclosure in the Farr paper of any specific manner of obtaining a substantially flat response. In fact, Farr even suggests that a flat response would not be advantageous. Farr suggests three different ways of generating a flat response but concentrates primarily on the use of a accelerometer as a transducer to detect seismic signals in a non-linear manner. Since the accelerometer has a response which increases with frequency, the output of the accelerometer tends to offset the Q filtering effects of the earth. However, the response of the accelerometer cannot be easily changed to match the Q filtering effects of the earth which vary greatly with soil conditions and geostructures within the earth. Consequently, accelerometers do not provide the flexibility or the preciseness required to produce a flat frequency response for differing geologies.

Consequently, although the effects of natural earth Q filtering have been known since Lord Raleigh's time (19th Century), to date, no system exists which has the capabilities and flexibilities of generating a flat frequency response for varying geologies.

SUMMARY OF THE INVENTION

The present invention overcomes the disadvantages and limitations of the prior art by providing a seismic line amplifier for conditioning a received seismic geophone signal for transmission to a data collection device. The amplifier increases the signal-to-noise ratio of the seismic geophone signal and provides an output signal having a substantially flat frequency response for a seismic impulse up to a predetermined frequency. This enhances the resolution of data derived from the seismic geophone signal despite natural earth filtering effects (Q) which inherently attenuate high frequency signals containing high resolution information.

The present invention may therefore comprise a seismic line amplifier for transmitting a seismic geophone signal comprising: a frequency response equalization device for operating on the seismic geophone signal to produce an output signal having a substantially flat frequency response up to a predetermined frequency.

The present invention may also comprise a method of conditioning a seismic geophone signal to provide a substantially flat frequency response of a seismic impulse and a high signal-to-noise ratio comprising the steps of: amplifying the seismic geophone signal by an amplification factor (1/Q) which is inversely proportional to an inherent attenuation factor (Q) of earth high frequency absorption which varies non-linearly with frequency of the seismic geophone signal.

The advantages of the present invention are that it uses low power drain circuitry such as complementary metal oxide semiconductor (CMOS) devices which allow the geophone line amplifier to be implemented with a small battery supply. This allows the geophone line amplifier to be located proximate to the geophone in the field. As a result, the seismic geophone signal, which has a very low amplitude, is only transmitted a small distance prior to conditioning and amplification of the signal by the seismic line amplifier of the present invention. This increases the signal-to-noise ratio of the seismic geophone signal and provides a substantially flat frequency response for a seismic inpulse to enhance the high resolution data contained within the higher frequency signals. An attenuator is also provided in the seismic line amplifier which is capable of setting a maximum signal output level for transmission to the data collection device. This increases the effective signal-to-noise ratio of the seismic geophone signal as a result of noise generated during transmission through the transmission line and during the amplification of the seismic geophone signal at the data collection device.

Additionally, the attenuator adjusts the null point of the circuit. In other words, the attenuator controllably attenuates the seismic geophone signal after it is amplified to adjust the frequency at which unity gain is achieved at the output of the amplifier between the amplification factor (1/Q) of the non-linear amplifier and the inherent attenuation factor (Q) of the earth. This provides additional flexibility in conditioning the signal to anticipated geological structures.

Also, the process of matching components, i.e., resistors and capacitors, is also used in the present invention to provide very precise parameters for operation of various components of the seismic line amplifier. Both resistors and capacitors are mixed and matched, rather than selecting a high precision capacitor and matching a resistor to provide the proper components. This greatly reduces the cost associated with the components since standard non-precision capacitors can be used.

BRIEF DESCRIPTION OF THE DRAWINGS

An illustrative and presently preferred embodiment of the invention is shown in the accompanying drawings, wherein.

DETAILED DESCRIPTION OF THE INVENTION

Figure 1:
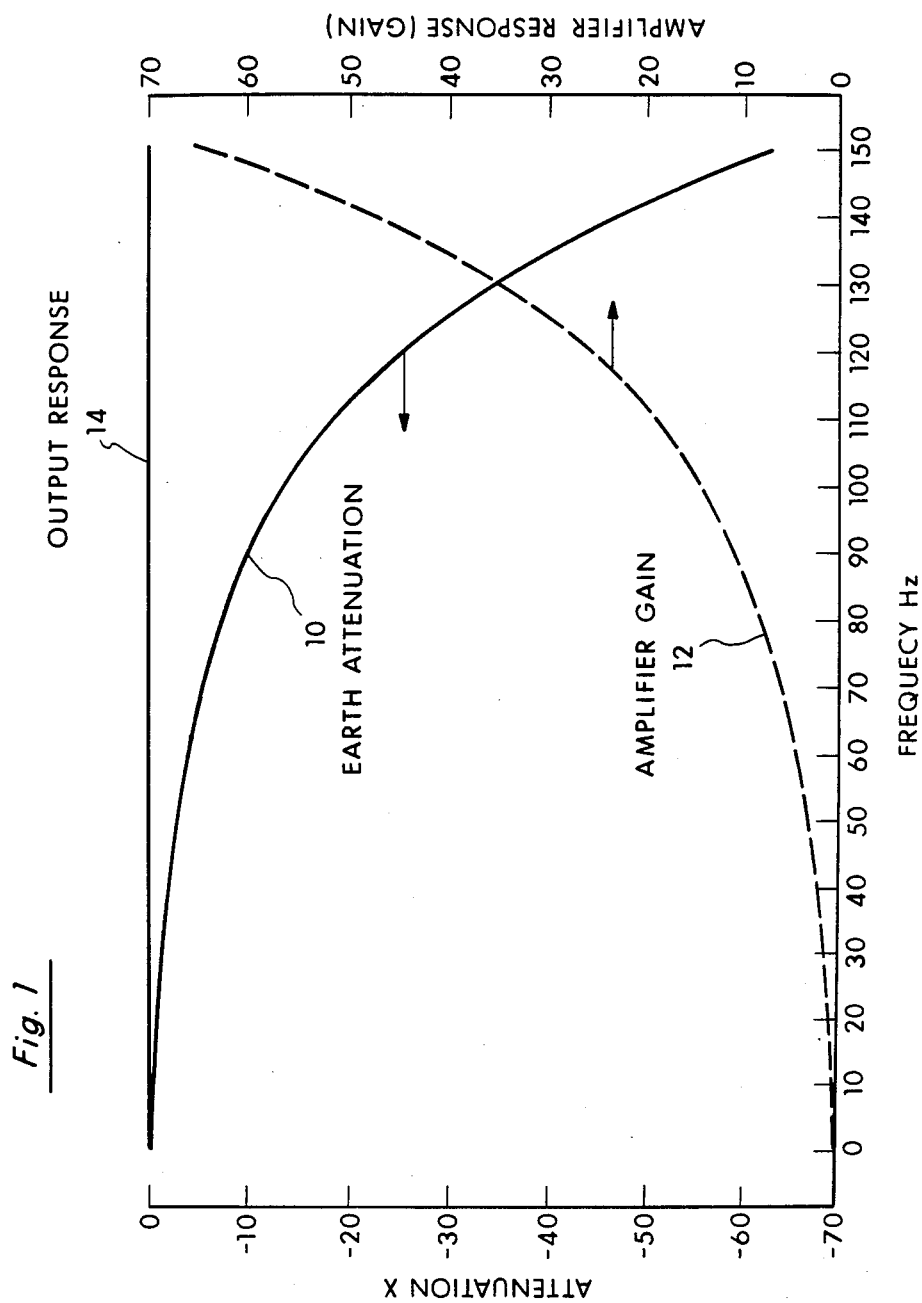
FIG. 1 is a graph of attenuation versus frequency illustrating natural earth filtering effects and the response of the geophone line amplifier of the present invention.

FIG. 1 is a graph of attenuation versus frequency for natural earth filtering effects (Q), and output gain of the geophone line amplifier versus frequency. Curve 10 is an example of a typical response illustrating the attenuation which occurs due to natural earth filtering effects (Q). These filtering effects of the earth vary greatly with soil materials as disclosed in the above referenced Farr papers. Attenuation for various materials is usually measured in dB per wavelength. Since the dB scale is logarithmic, the attenuation is non-linear. Curve 10 illustrates an attenuation of 0.6 dB per wavelength at a velocity of 10,000 feet per second at a target depth of approximately 5,000 feet. Of course, seismic studies in different materials at different depths will cause the attenuation curve, due to natural earth filtering effects (Q), to vary greatly.

Curve 12 illustrates the amplifier gain which is necessary to compensate for the earth attenuation curve 10 in order to produce an output response 14 which is flat. Amplifier gain curve 12 produces a gain of 6.0 dB per ocatve which approximates the inverse of the earth attenuation curve 10. When earth attenuation curve 10 is convolved with the amplifier gain curve 12, an output response 14 is produced which has a perfectly flat frequency response over the indicated frequency range of 0 to 150 hertz.

Figure 2:
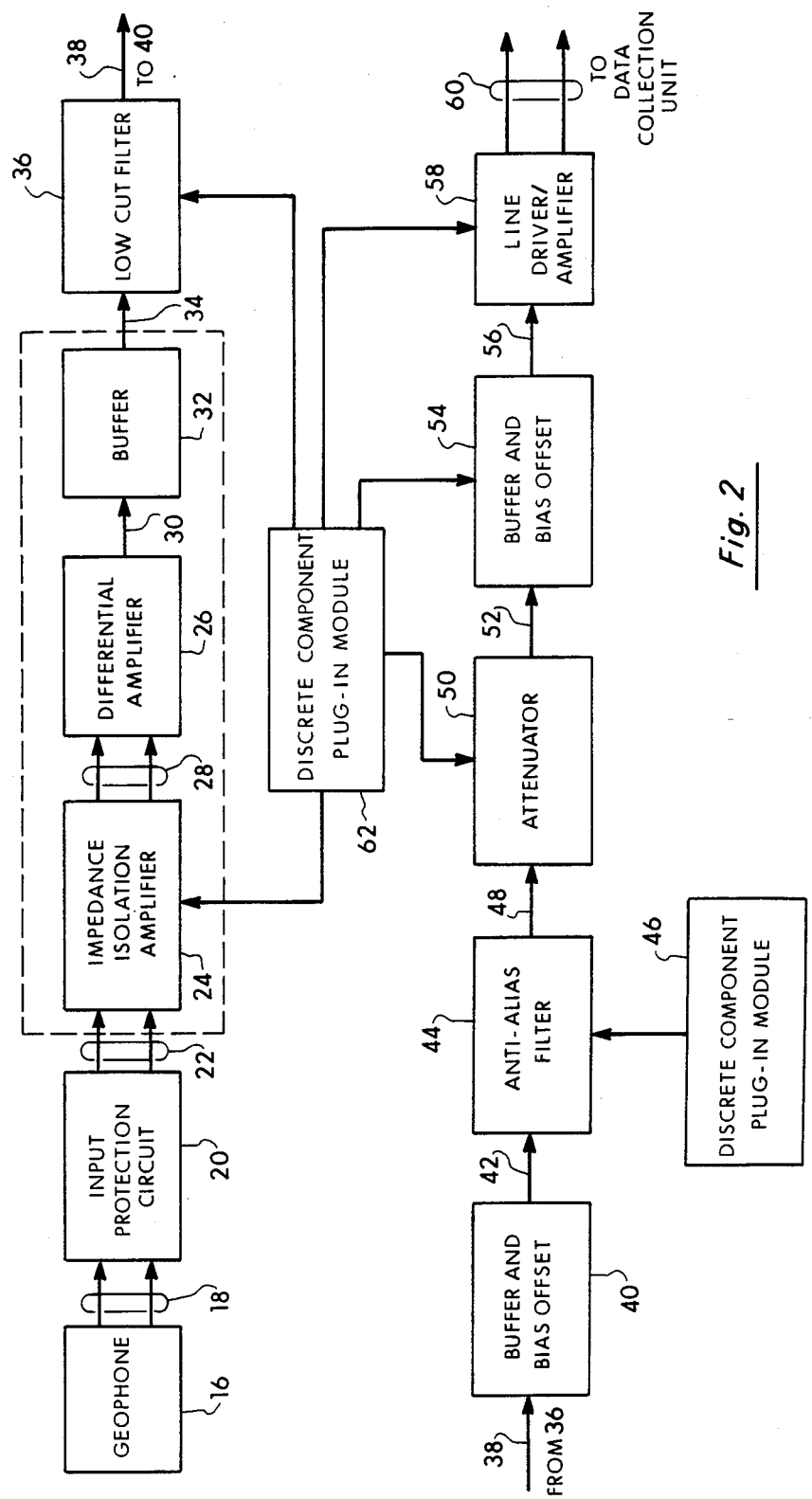
FIG. 2 is a schematic block diagram of the geophone line amplifier of the present invention.

FIG. 2 is schematic block diagram illustrating the geophone line amplifier of the present invention. Geophone 16 can comprise either a single geophone or an array of geophones which are used to collect seismic wave acoustical data in a predetermined location and produce an electrical output response 18. The geophone output 18 comprises a common mode output which is applied to an input protection circuit 20. Input protection circuit 20 protects the remaining circuitry of the device of the present invention from surges produced on common mode input 18. The common mode output 22 of input protection circuit 20 is applied to impedance isolation amplifier 24 which comprises a voltage follower circuit to isolate the differential amplifier circuitry 26. Differential amplifier circuitry 26 receives the common mode input 28 and produces an output 30 which is a normal mode signal. Output 30 of differential amplifier 26 is applied to a buffer 32 which produces an output 34. Output 34 is applied to low cut filter 36 which functions with the differential amplifier as a non-linear amplifier. Buffer 32 buffers output 30 of differential amplifier 26 and provides impedance isolation between differential amplifier 26 and low cut filter 36. Low cut filter 36 provides a non-linear amplifier gain such as illustrated in curve 12. The output 38 of low cut filter 36 is applied to buffer and bias offset 40 which buffers the output of the low cut filter 36 and provides a dc offset signal to offset the dc signal generated by the low cut filter 36 to a zero voltage. Although a blocking capacitor could be used in place of the buffer and bias offset 40, the circuit illustrated in FIG. 2 would not comprise a true dc amplifier.

The output 42 of buffer and bias offset 40 is applied to anti-alias filter 44 which comprises a series of low pass filters which successively attenuate increasingly higher frequencies. For example, the present invention provides an attenuation of 48 dB per octave. This degree of non-linear attenuation reduces the magnitude of harmonic frequencies to a negligible level so that lower sampling rates can be used in the data collection unit when sampling the data. A discrete component plug-in module 46 can be used to connect a selected group of discrete components to the active components of the anti-alias filter 44 to provide the desired parameters.

Output 48 of anti-alias filter 44 is applied to an attenuator 50 which functions to attenuate the signal received from anti-alias filter 44. By adjusting the level of signal 48, the frequency at which unity gain occurs as output line 60 isolation amplifier 24 can be adjusted. By having the ability to adjust the frequency at which unity gain occurs, (i.e., the null point), a great deal of flexibility is provided for adjusting the seismic line amplifier to various geologies. The output 52 of attenuator 50 is applied to buffer and bias offset circuitry 54 which functions to buffer the output and eliminate any dc bias in output signal 60. The dc adjusted signal 56 is then applied to line driver/amplifier 58 which produces a common mode signal 60, and has provisions for additional amplification, prior to transmission to a data collection unit.

A discrete component plug-in module 62 is used to provide selected discrete components to control the parameters of impedance isolation amplifier 24, low cut filter 36, attenuator 50, buffer and bias offset 54 and line driver/amplifier 58. The discrete components of a particular module are all matched to provide the desired parameters for each of these devices so that they coincide to produce an output which matches the geology of the particular region. For example, if it were to desire to perform high resolution seismic exploration in the Rocky Mountain overthrust region, a discrete component plug-in module would be selected to provide the desired amplification of the signal in impedance isolation amplifier 24 which matches the non-linear gain to be provided in low cut filter 36. Additionally, the magnitude of the output signal would be simultaneously set in attenuator 50 and the output of line driver/amplifier 58 would also be adjusted to transmit the signal to a data collection unit. In this manner, a single discrete component plug-in module 62 is capable of providing all of the necessary parameters for seismic exploration for known geologies so that an output signal can be produced which contains high resolution information and which is capable of being transmitted with a high signal-to-noise ratio without clipping the low frequency part of the signal.

Figure 3:
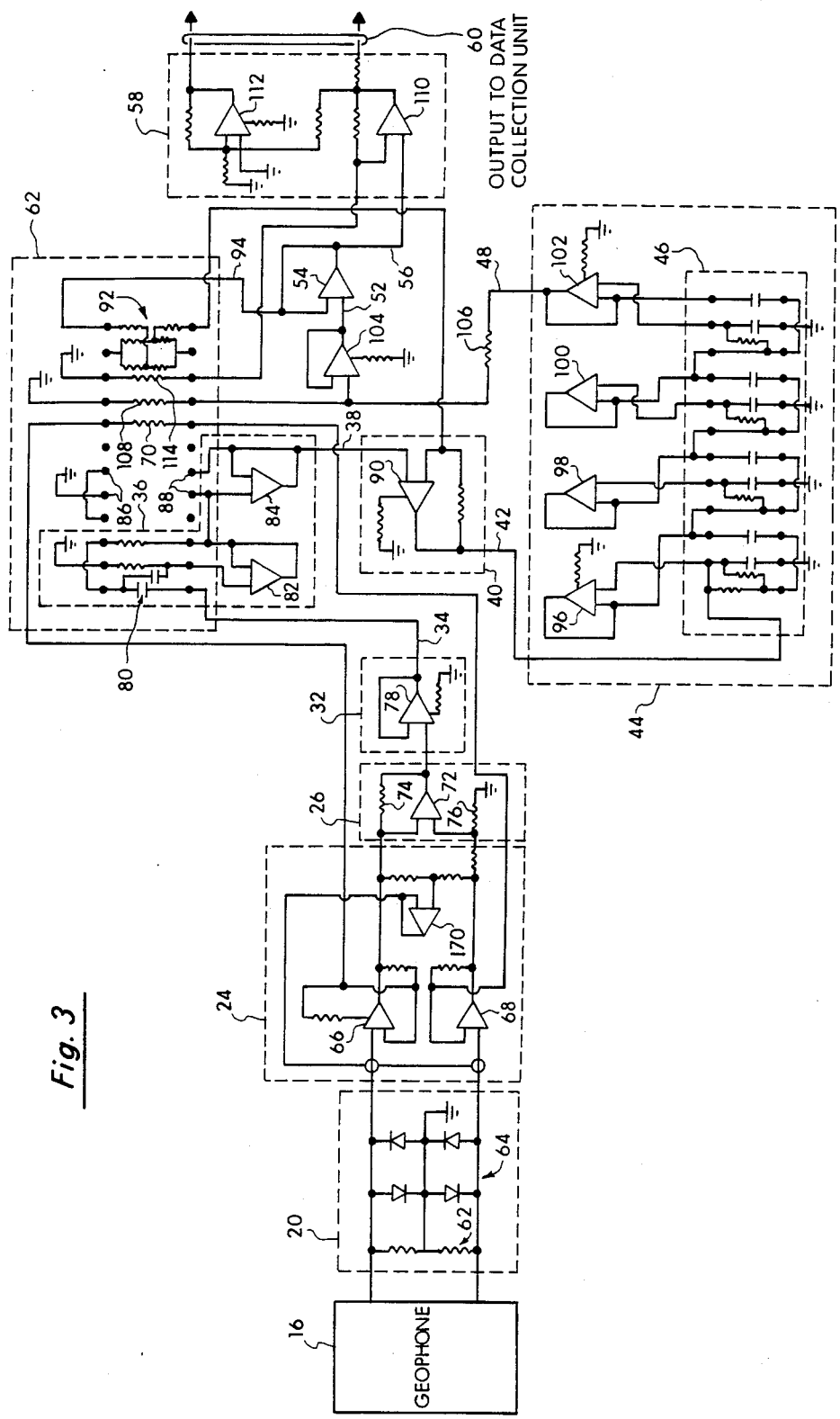
FIG. 3 is a schematic diagram illustrating the components of the geophone amplifier of the present invention.

FIG. 3 is a schematic diagram of one implementation of the device of the present invention. Geophone 16 produces an output which is applied to an input protection circuit 20 having a voltage divider network 62 which applies a split voltage to a plurality of diodes 64. Diodes 64 protect the circuitry from surges in the line. The output of the input protection circuit is then applied to impedance isolation amplifier 24 having amplifier 66, 68 which constitute a cross-coupled preamplifier stage with a differential input and a differential output. Cross-coupled resistor 70, which comprises one of the discrete component in plug-in module 62, controls the gain of the preamplifier stage comprising amplifiers 66 and 68. Amplifier stage 170 functions as a buffered input guard for the common mode signal received from amplifiers 66 and 68. The common mode output signal of impedance isolation amplifier 24 is applied to differential amplifier 26 which comrprises amplifier 72 and resistors 74, 76 which transform the common mode signal into a normal mode signal. The normal mode signal is then applied to buffer stage 32 which comprises an amplifier connected as a voltage follower circuit. The output 34 of buffer stage 32 is then applied to low cut filter 36 comprising a series of resistors and capacitors 80 connected to amplifier 82 through discrete component plug-in module 62. Amplifier 82 acts as an active high pass filter which non-linearly filters, or in conjunction with the differential amplifier non-linearly amplifies, the geophone line amplifier signal by a factor of $1/Q$ to provide an output signal which compensates for natural earth filtering effects (Q). Discrete components 80 are selected to provide the desired $1/Q$ response of filter 36 according to the geology of the region. Various matched components are used in various plug-in modules to custom match different regions of seismic exploration. Amplifier stage 84 is shown as a buffer stage at the output of amplifier 82. Various components can be coupled between connectors 86, 88 to allow amplifier 84 to function as an additional filter stage for increased Q attenuation factors. For example, some geologies result in approximately 6 dH to 12 dB per octave attenuation due to natural earth Q filtering. Consequently, a single amplifier stage 82 is capable of providing a $1/Q$ factor of 6 dB to 12 dB per octave. However, other geologies result in Q factors of 18 dB or 24 dB per octave. In this case, a $1/Q$ factor of 18 dB or 24 dB requires a second active filter stage 84 to achieve these values.

The output 38 of low cut filter 36 is applied to buffer and bias offset circuitry 40 comprising amplifier stage 90 which is connected as a voltage follower circuit. Resistor divider network 92 which comprises a series of discrete components within the discrete component plug-in module 62 provide a biasing voltage to amplifier 90 to offset the bias injected in the signal by the low cut filter 36 via line 92. A similar signal is applied to buffer and bias offset circuit 54 via line 94.

The output 42 of buffer and bias offset stage 40 is applied to the anti-alias filter 44 which provides a non-linear attenuation of the signal. For example, the anti-alias filter may be capable of providing an attenuation of 48 dB per octave. In other words, the anti-alias filter 44 acts as a high roll off, low pass filter which is capable of providing sufficient attenuation to eliminate the effects of harmonics of the seismic geophone signal and thereby allow lower sampling rates in the data collection unit. The anti-alias filter 44 has four separate filtering stages 96, 98, 100, 102 for providing the desired attenuation of 48 dB per octave. Various matched discrete components are provided in discrete component plug-in module 46 to produce the desired attenuation.

Output 48 of the anti-alias 44 is applied to attenuator 50 (FIG. 2) comprising amplifier 104, resistor 106 and resistor 108. Resistor 108 functions to control the attenuation or gain of amplifier 104. Resistor 108 is matched with the other components of discrete component plug-in module 62, and in conjunction with an adjustable amplifier in the line driver/amplifier 58 controlled by resistor 114 can provide either attenuation or amplification to condition the signal for transmission, and to control the frequency at which unity gain is achieved on output line 60.

The output 52 of attenuator 50 is applied to buffer and bias offset 54 which is connected to discrete components 92 by way of conductor 94. As set forth above, discrete components 92 provide a bias adjustment level for amplifier 54 to subtract the dc voltages injected in the signal by circuitry upstream from the buffer and bias offset 54.

The output 56 of buffer and bias offset 54 is applied to the line driver/amplifier 58 which comprises two amplification stages 110, 112. Both of the amplifiers 110 and 112 function to convert the normal mode signal into a common mode signal to produce output 60. The gain provided in this stage is controlled by resistor 114 which, as mentioned above, comprises one of the discrete components of discrete component plug-in module 62. In this manner, the line driver/amplifier 58 conditions the seismic signal to be transmitted over a long distance with high clarity and at a signal level which can be used by the data collection unit without clipping.

Each of the amplifiers illustrated in the present invention use low power drain circuitry such as complimentary metal oxide semiconductor (CMOS) devices which are capable of operating from small power supplies. These devices are typically packaged as quad op amps such as the LM 146 series produced by National Semiconductor which contains four of the operational amplifiers packaged in a single dual-in-line package. Since these devices are packaged on the same substrate, minimal drift is experienced and an extremely stable output is provided. As shown in FIG. 3, a single chip can be used to package amplifier 66, 68, 70 and 72, while another chip can be used to package amplifiers 78, 82, 84, 90. Also, a single chip can be used to package amplifiers 96, 98, 100, 102, and another chip can be used to package amplifiers 104, 54, 110, 112.

Consequently, the present invention provides a seismic line amplifier which is extremely stable in operation, has low power drain, is portable and can be located adjacent the geophone in the field and is capable of producing a low noise signal which is designed to transmit in a common mode format across a transmission cable to a data collection unit and match the signal input requirements of the data collection unit. The present invention provides an extremely flexible system which uses discrete component plug-in modules having discrete components which are matched with one another to provide a response which is custom designed to the geology of the region. The discrete component module plug-in units provide the proper 1/Q correction filtering necessary to produce a flat frequency response for the geology of the region, as well as adjusting the frequency of the null point. The discrete components in the plug-in module are designed to interact with each other to provide the maximum dynamic range of the signal during filtering to increase the signal-to-noise ratio without clipping the signal, and simultaneously provide the proper gain at the output to match the signal levels required at the data collection unit.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical applications to thereby enable others skilled in the art to best utilize the invention in various embodiments and various modifications as are suited to their particular use contemplated. It is intended that the appended claims be construed to include other alternative embodiments of the invention except insofar as limited by the prior art.

What is claimed is:

1. A seismic line amplifier for receiving from a geophone a seismic signal representing an earth originated seismic impulse, said seismic amplifier comprising:
   first circuit means responsive to a receipt of a seismic signal for producing a first signal representing an essentially flat frequency response of said seismic impulse,
   means for conditioning said first signal to produce a second signal,
   second circuit means for amplifying said second signal and for adjusting the frequency at which unity gain of said received seismic signal occurs, and
   means for transmitting said amplified and adjusted signal as an output signal to a signal utilization means.

2. The seismic line amplifier of claim 1 wherein said first circuit means comprises non-linear amplifier means for amplifying said received geophone seismic signal by a factor which varies non-linearly with frequency to offset inherent absorption affects on high frequencies of the earth so is to produce said first signal having an essentially flat frequency response with respect to said seismic impulse.

3. The seismic line amplifier of claim 2 wherein said second circuit means comprises high gain amplifier means for amplifying said second signal to provide said amplified and adjusted output signal which is not limited in dynamic range by an unequal frequency response of said seismic signal from said geophone.

4. The seismic line amplifier of claim 3 in which said means for conditioning includes filter means for attenuating said first output signal at frequencies greater than a predetermined frequency prior to said transmission to said utilization means.

5. The seismic line amplifier of claim 4 wherein said amplifier further comprises:
   replaceable module means for incorporation into said amplifier for coupling preselected discrete components to said non-linear amplifier means and to said filter means to provide a desired response of said amplifier for different predetermined geological conditions.

6. The seismic line amplifier of claim 5 wherein said discrete components of said module means are matched to provide precise adjustment of said non-linear amplifier means and said active filter means.

7. A seismic line amplifier for conditioning a seismic signal received from a geophone to increase the signal to noise ratio of said seismic signal and to provide a substantially flat frequency response of an earth originated seismic impulse up to a predetermined frequency so as to enhance the resolution of graphic data that can be derived from said seismic signal despite natural earth filtering effects (Q) which inherently attenuate higher frequency signals of said impulse containing high resolution information, said seismic line amplifier comprising:

first means for receiving said seismic signal from said geophone as a common mode signal, differential amplifier means connected to said first means for converting said common mode signal to a normal mode signal, non-linear amplifier means for amplifying said normal mode signal by a factor of 1/Q to provide a first signal having said substantially flat frequency response of said seismic impulse and having an increased potential dynamic range of amplification of said geophone signal for frequencies up to said predetermined frequency, anti-alias filter means having a plurality of filtering stages for providing a second signal having a high degree of attenuation of said first signal above said predetermined frequency to minimize harmonic frequencies of said seismic geophone signal above said predetermined frequency, attenuator means for adjusting the level of said second signal and the frequency at which unity gain of said seismic geophone signal is achieved at an output of said seismic line amplifier considering said natural earth filtering effects (Q) and said amplification by a factor of 1/Q by said non-linear amplifier means, and bias adjustment means for removing any dc bias voltage from said signal at a said output of said seismic line amplifier.

8. The seismic line amplifier of claim 7 further comprising:

replaceable module means for insertion into said amplifier for coupling predetermined discrete components to said amplifier to control operational parameters of said seismic line amplifier for various geological conditions.

9. The seismic line amplifier of claim 7 in which said output of said seismic line amplifier comprises:

line driver means for transforming said normal mode signal to a common mode signal for transmission to said data utilization means.

10. The seismic line amplifier of claim 7 further comprising shunt regulator means intermediate said geophone and said first means for preventing a voltage in excess of a predetermined level from being applied to said first means.

11. The seismic line amplifier of claim 8 wherein capacitors and resistors within said module are selected to optimize desired parameters of said amplifier.

12. A method of conditioning a seismic geophone signal received by a seismic geophone line amplifier to provide a substantially flat frequency response of an earth originated seismic impulse and to provide a high signal-to-noise ratio of an output signal at an output of said seismic line amplifier, said method comprising the steps of:

amplifying said received signal by an amplification factor (1/Q) which is inversely proportional to an inherent high frequency attenuation factor (Q) of earth absorption on seismic impulses signals and which absorption varies non-linearly with frequency of said seismic geophone signal; and controllably attenuating said amplified signal to maintain a predetermined signal level at said output and to adjust the frequency at which unity gain is achieved between said amplification factor (1/Q) and said inherent attenuation factor (Q) for said received seismic signal.

13. The method of claim 12 further comprising the step of:

amplifying said seismic geophone signal by a constant factor after said attenuation to boost signal levels so as to increase the signal-to-noise ratio of said output signal in preparation for transmission to a data collection unit.

14. The method of claim 13 further comprising the steps of:

providing discrete components for said amplifier on a replaceable module which are matched to provide a desired response from active components of said seismic geophone line amplifier for predetermined geological conditions.

15. A seismic geophone line amplifier for receiving a seismic signal from a geophone and for providing a substantially flat frequency response of an earth originated seismic impulse represented by said signal, said amplifier comprising:

means for amplifying said received signal by an amplification factor (1/Q) which is inversely proportional to an inherent high frequency attenuation factor (Q) of earth absorption on seismic impulse signals and which absorption varies non-linearly with frequency of said seismic geophone signal; and means responsive to said amplification for controllably attenuating said amplified signal to maintain a predetermined output level and to adjust the frequency at which unity gain is achieved for said received signal at an output of said amplifier between said amplification factor (1/Q) and said inherent attenuation factor (Q).

16. The amplifier of claim 15 in which said amplifier further comprises:

means for amplifying said seismic geophone signal by a constant factor after attenuation by said attenuation means to boost signal levels so as to increase the signal-to-noise ratio of said signal on said amplifier output in preparation for transmission to a data collection unit.

\* \* \* \* \*